United States Patent Office 3,700,654
Patented Oct. 24, 1972

3,700,654
NAD SALTS AND METHODS OF PREPARATION
Donald R. Brusca, Bainbridge Island, Wash., assignor to Enzomedic Laboratories, Inc., Seattle, Wash.
No Drawing. Continuation-in-part of application Ser. No. 619,935, Mar. 2, 1967. This application May 19, 1969, Ser. No. 825,917
Int. Cl. C07d 51/54
U.S. Cl. 260—211.5 R    3 Claims

ABSTRACT OF THE DISCLOSURE

Neutral, solid salts of nicotinamide adenine dinucleotide are produced as a physiologically acceptable and stable form of the coenzyme. The salts are useful in the treatment of alcoholism, drug addiction, ileus and shock associated therewith, schizophrenia, and rheumatoid arthritis.

This application is a continuation-in-part of my co-pending application U.S. Ser. No. 619,935 filed Mar. 2, 1967 and now abandoned.

This invention relates to novel, stable, solid salts of nicotinamide adenine dinucleotide (NAD), and particularly encompasses new forms of NAD that are uniquely adapted for therapeutic use. These solid NAD salts remain stable on storage at ambient temperatures for extended periods and may be conveniently and inexpensively dissolved in sterile water to produce neutral, isotonic solutions suitable for injection.

In the recent past NAD has been found to be therapeutically useful in the treatment of several disease states (U.S. Pat. Nos. 3,158,540; 3,266,989; 3,326,756; 3,341,412; and 3,412,190). The discovery of this therapeutic utility necessitated the development of new forms of NAD which would be stable on storage and physiologically acceptable.

NAD is a naturally occurring coenzyme that has been isolated previously only in its free-acid form as a hygroscopic white powder. Although unspecified neutral solutions of NAD were incidentally prepared by Mitz in U.S. Pat. No. 2,828,302 during an ion-exchange process for separating coenzyme mixtures, isolation of salts of NAD in their pure, solid form has not previously been attempted. The importance of the isolation of the solid salt to its therapeutic usefulness is demonstrated in Example 1. The sodium salt of NAD rapidly decomposed when stored in neutral, isotonic, sterile solution, while the solid sodium salt was stable when stored at the same ambient temperature. The rapid decomposition of NAD salt solutions on storage makes this form of NAD unacceptable for therapeutic use. However, the solid salts of NAD are sufficiently stable on storage to be therapeutically useful.

Earlier methods of administering NAD required the addition of a measured quantity of aqueous disodium phosphate or sodium bicarbonate buffer supplied in one vial to a second vial containing the solid free-acid of NAD. The expense of supplying the vial of pre-set diluent and the inconvenience and possibility for error contingent with the pre-injection manipulations ruled against these methods. More important, the disodium phosphate diluent partially dissolved the glass of the vial in which it was stored, and resulted in a neutral solution of NAD which was extremely hypertonic, causing undue pain at the injection site. The sodium bicarbonate diluent caused excessive evolution of carbon dioxide when mixed with the NAD, creating pressure on the syringe upon addition of the diluent.

It is the object of the present invention to overcome the inherent deficiencies of methods commonly employed to neutralize NAD for therapeutic use. Another object is to provide neutral salts of NAD which are stable when stored for prolonged periods of time and which will produce neutral, isotonic solutions of NAD when simply mixed with water. Other objects will become apparent from the following detailed description.

The present invention includes within its scope the solid, therapeutically useful sodium, potassium, calcium, ammonium, zinc, lithium, magnesium, manganese, and tris-(hydroxymethyl)-aminomethane salts of NAD which have hitherto not been described in the chemical literature. These salts can be isolated as stable, free flowing, white solids devoid of impurities according to the process hereinafter described.

In essence, the process for forming these neutral salts consists of reacting an aqueous solution of NAD with a solution or suspension of a basic compound at ambient temperature or below with constant stirring and pH monitoring until a pH of 7.0 is attained. (Examples of such compounds might be tris-(hydroxymethyl)-amminoethane or the oxides, hydroxides, carbonates or phosphates of sodium, potassium, calcium, ammonium, zinc, lithium, magnesium or manganese.) The basic solution is usually added to the NAD solution, but in the case of oxides which are less readily soluble in water, it is good practice to reverse the addition. Once neutrality is achieved, five or more volumes of a hydrophilic organic solvent such as methanol, ethanol or acetone cooled to 0° C. or less is slowly added with contsant stirring to the aqueous salt solution to precipitate the resulting NAD salt. Said salt is then collected and washed with more solvent until a white, crystalline product is obtained. If the salt solution is completely evaporated upon neutralization, one obtains a yellowish, tacky residue of indefinite and non-reproducible composition.

If desired, the aqueous salt solution can be concentrated by evaporation and thereafter lyophilized to obtain the same desirable, free flowing, solid product. In both methods of operation, the product is eventually dried over a desiccant and under vacuum. When 1.5 millimoles of any of the solid NAD salts thus obtained are reconstituted with 10 ml. of sterile water prior to injection, there results an isotonic solution which is physiologically acceptable without further adjustment of the pH.

The following examples illustrate the invention and are not to be construed as a limitation thereof.

EXAMPLE 1

Ten grams of NAD in the free-acid form were dissolved in 85 ml. of distilled water at room temperature. This solution was titrated to a pH of 7 with 15.2 ml. of one normal sodium hydroxide solution with constant stirring. Five volumes of acetone cooled to −10° C. were then slowly added with stirring and the resulting mixture was centrifuged at 2000 r.p.m. for 15 minutes. The supernatant was decanted and the yellow, viscous product was dissolved in water, transferred to a liter flask and frozen in a thin layer on the sides of the flask by cooling in an acetone-Dry Ice bath. The solid thus formed was lyophilized to a fine white powder and the NAD content was determined enzymatically with alcohol dehydrogenase measured by increased absorption at 340 millimicrons. It was found that the molar absorbancy of the enzymatically reduced NAD sodium salt was 4800 compared to 4400 for the reduced free acid. In addition, NAD as the free acid was found to liquefy at 155° C. whereas the solid sodium salt began to melt at 180° C. The presence of sodium in the salt was confirmed by the U.S.P. procedure. The stability on storage of the solid sodium salt was compared to the stability of sterile solutions of sodium hydroxide-neutralized NAD, and the results are presented below:

| Time stored at 22° C. | Percent β-NAD content | |
|---|---|---|
| | Salt solution | Solid salt |
| Weeks: | | |
| 0 | 86 | 86 |
| 1 | 81 | |
| 2 | 77 | |
| 4 | 74 | |
| 7 | 72 | |
| 10 | 66 | 90 |
| 15 | 62 | |
| 23 | | 87 |
| 33 | | 87 |

The isolated, solid salt of NAD was stable on storage at ambient temperature, while the NAD in neutralized solution rapidly decomposed. Consequently, only the solid, stable, neutral salts of NAD are suitable dosage-forms for therapeutic use.

EXAMPLE 2

A mixture of 1.2 grams of NAD and 40.3 milligrams of magnesium oxide in 12 ml. of distilled water was stirred vigorously for 3 hours after which time the suspended magnesium oxide had dissolved and the pH of the solution had stabilized at 7.0. Five volumes of cold acetone were then added and the mixture was treated in a manner identical to that described in Example 1. The white product obtained had a molar absorbancy after reduction with alcohol dehydrogenase of 5000 at 340 millimicrons compared with 4900 for the NAD employed as a starting material. Furthermore, the NAD magnesium salt failed to liquefy at 300° C. whereas the NAD itself melted at 155° C. The presence of magnesium in the salt was confirmed by the U.S.P. procedure. Although the molar ratio of NAD to sodium in the neutral sodium salt (Example 1) is 1:1, the ratio of NAD to magnesium in the neutral magnesium salt is 1.81:1 (not 2:1 as might be superficially expected from valence considerations). This illustrates that the claimed salts are defined on a basis of their neutrality rather than on a basis of complete acid-base reaction.

In a manner similar to that described in the foregoing examples, one can react NAD with potassium phosphate, lithium hydroxide, calcium carbonate, ammonium hydroxide, zinc oxide, manganese carbonate, tris-(hydroxymethyl)-aminomethane, or similar bases to form the corresponding neutral salts. When any of these solid, stable, neutral salts are dissolved in water at the proper concentration, an isotonic, neutral NAD solution is obtained which is suitable for injection.

It is to be understood that nicotinamide adenine dinucleotide or NAD as used in the foregoing specification and appended claims is the presently acceptable name for the coenzyme previously known as diphosphopyridine nucleotide or DPN.

I claim:
1. The solid, stable, neutral salts of nicotinamide adenine dinucleotide selected from the group consisting of sodium, potassium, lithium, calcium, ammonium, zinc, magnesium, manganese, and tris-(hydroxymethyl)-aminomethane salts thereof.
2. The solid, stable, neutral, sodium salt of nicotinamide adenine dinucleotide as claimed in claim 1.
3. The solid, stable, neutral, magnesium salt of nicotinamide adenine dinucleotide as claimed in claim 1.

References Cited

UNITED STATES PATENTS

| 2,828,302 | 3/1958 | Mitz | 260—211.5 |
| 3,435,026 | 3/1969 | Samejima et al. | 260—211.5 |

LEWIS GOTTS, Primary Examiner

J. R. BROWN, Assistant Examiner

U.S. Cl. X.R.

260—999